June 4, 1929.  L. S. JAUSSAUD  1,715,368
INTERNAL COMBUSTION ENGINE
Filed June 8, 1926   2 Sheets-Sheet 1
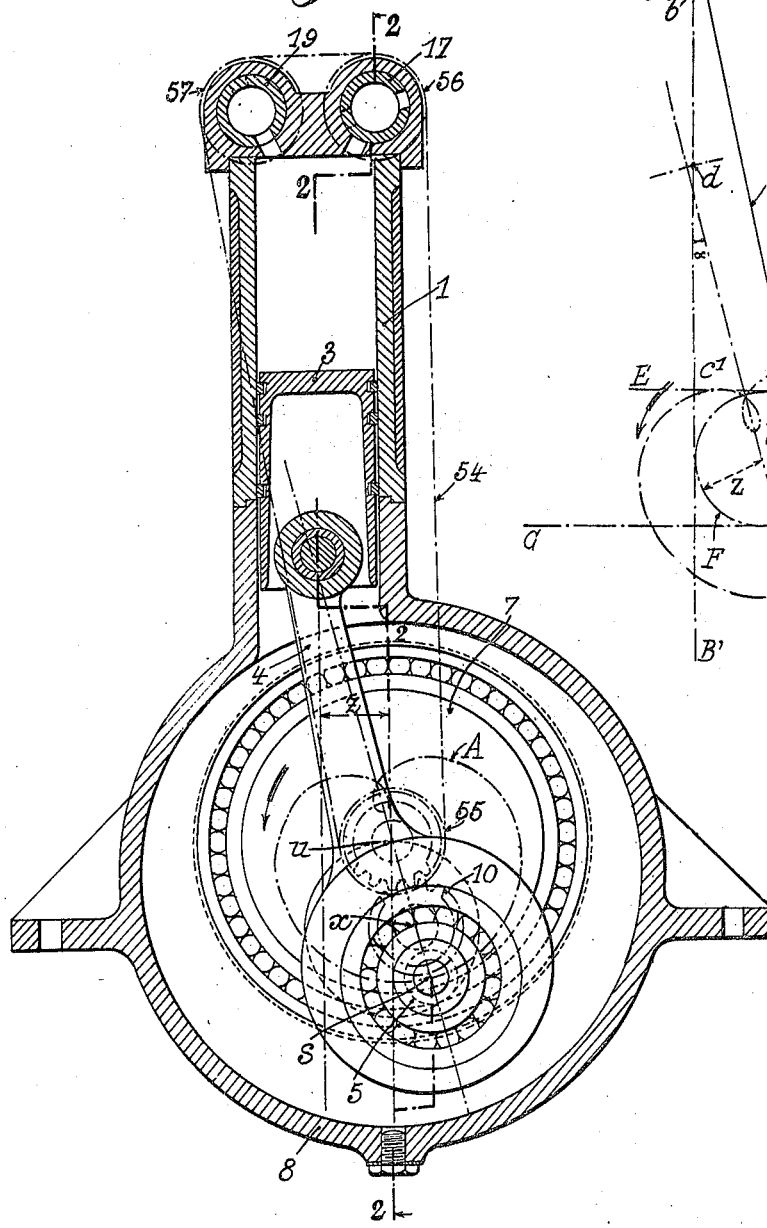
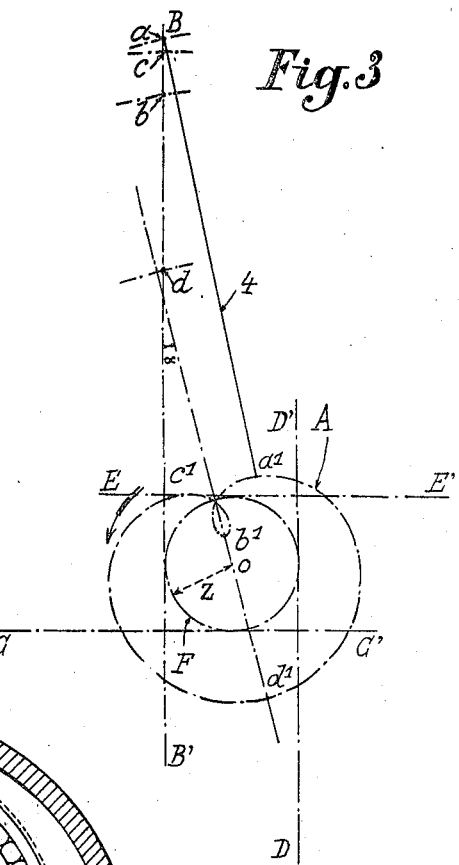
Lazare Stephane Jaussaud
INVENTOR

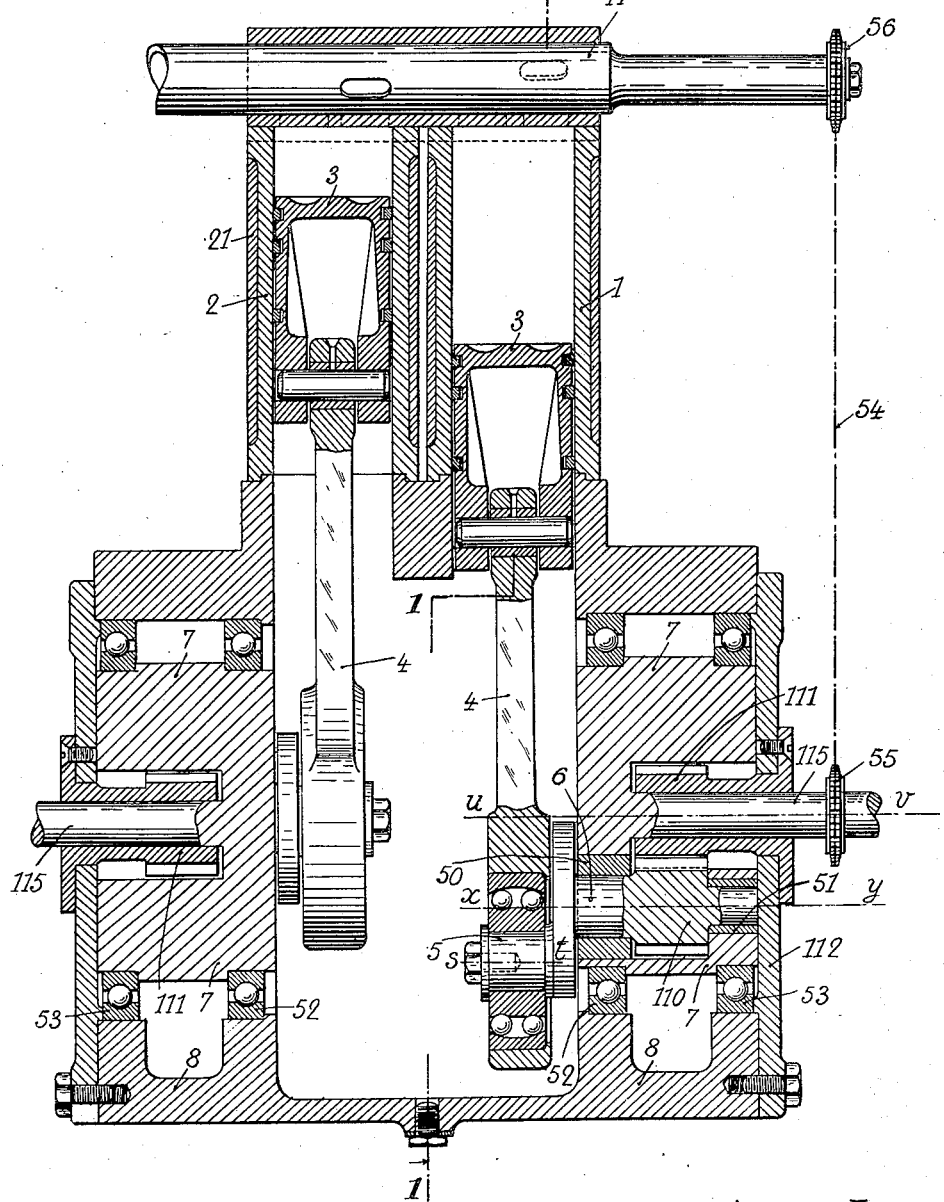

Patented June 4, 1929.

1,715,368

UNITED STATES PATENT OFFICE.

LAZARE STÉPHANE JAUSSAUD, OF DIJON, FRANCE.

INTERNAL-COMBUSTION ENGINE.

Application filed June 8, 1926, Serial No. 114,388, and in France June 22, 1925.

This invention relates to internal combustion engines of the epicycloidal type having unequal admission, compression, expansion and exhaust strokes, and more particularly to an engine wherein the crankshaft has secured thereto a planetary pinion adapted to mesh with and roll about a stationary pinion.

One object of the invention consists in providing an engine of this type wherein the axis of the cylinder or of each cylinder is tangent to a circle concentric with the stationary pinion, whereby the piston rod will coincide or substantially coincide with the cylinder axis at the ignition instant, and whereby the piston rod will have a very small inclination with respect to the cylinder axis during the compression and expansion strokes, thus reducing the friction and wear to a minimum.

The invention will be set forth in the following description which refers by way of example to a two cylinder engine provided with rotary valve gear, as shown in the appended drawings.

Fig. 1 is a cross section on the line 1—1 of Fig. 2 of an engine constructed in accordance with the invention.

Fig. 2 is a lengthwise section on the line 2—2 of Fig. 1.

Fig. 3 shows the diagram for the epicycloidal motion of each crank pin, and the respective positions of the corresponding piston.

In each cylinder 1 and 2 is slidably mounted a piston 3 which is connected with the crank pin 5 of the crankshaft 6, by means of the piston rod 4. The said crankshaft is rotatably mounted in bearings 50, 51, provided at both sides of a chamber formed in a support or disc 7 which is rotatably mounted in the crankcase 8 through the medium of anti-friction bearings 52 and 53. Integral with the crankshaft journal is a planetary pinion 110 which extends between bearings 50 and 51 and engages a stationary pinion 111 secured to the end plate 112 of the crankcase 8. The engine shaft is made of two parts 115 integral with or secured to the discs 7 and extending through pinions 111 out of the crankcase.

Axes $s\ t$, $u\ v$ and $x\ y$ respectively denote the axes of crank pin 5, pinion 111 and pinion 110; axis $u\ v$ coincides with the axis of rotation of the rotatable disc 7.

It is assumed that the valve gear is of the rotary valve type, 17 and 19 denoting said valves which are disposed upon the cylinder head of the engine and driven by a chain 54 passing upon sprocket wheels 55, 56, 57 keyed respectively to the engine shaft 115 and to the rotary valves 17 and 18.

With the engine running, the thrust of the piston rod upon the crank pin 5 will tend to rotate the planetary pinion 110 about its axis $x\ y$. The said pinion, rolling upon the stationary pinion 111, rotates the disc 7 about its axis $u\ v$. Due to this epicycloidal motion, the crank pin 5 describes the epicycloidal curve A.

The movement of rotation of the rotatable discs 7 is imparted to the driving shafts 115.

The admission and exhaust being suitably timed by the rotary valves 17 and 19, the cycle of the axis of the crank pin will take place as shown in Fig. 3:

Admission during the stroke $a^1\ b^1$ of the crank pin.

Compression during the stroke $b^1\ c^1$ of the crank pin.

Expansion during the stroke $c^1\ d^1$ of the crank pin.

Exhaust during the stroke $d^1\ a^1$ of the crank pin.

It will be noted that, by suitably arranging the epicycloidal gear formed by disc 7, wheel 111 and pinion 110, the plane containing the axis $u\ v$, $x\ y$ and $s\ t$ (said axes are evidently in the same plane for each end of the stroke of the piston) may be inclined through the desired angle $\alpha$ upon the axis of symmetry of the epicycloidal curve A, the distance between points $a$ and $c$ depending on the angle $\alpha$. The shape of the curve A and the angle $\alpha$ will be such that the position of the point $a$ (end of the exhaust stroke) corresponds substantially to the top of the cylinder; as far as is allowed by the construction of the piston and the cylinder, the burnt gases are thus almost completely discharged.

According to the invention, the axis B B' of the cylinder is tangent to a circle F concentric with the stationary pinion 111. The radius $z$ of this circle will be so calculated that the axis B B' will intersect the epicycloidal curve A, near or at point $c^1$ which corresponds to the ignition instant. In this manner, the axis of the connecting rod 4 (that is the line which passes through the axes of the crankpin and the piston gudgeon pin) will coincide with the axis B B' of the cylinder at the ignition instant that is when the stresses on the piston have their maximum value. The lateral stresses, and hence the friction upon the cylinder walls will thus be greatly reduced. It should also be observed that, in contradistinction with the usual engines, the torque of the thrust transmitted by the piston rod 4 to the crankpin 5 is considerable, although the axis of the piston rod coincides or substantially coincides with the cylinder axis.

Due to this arrangement, the piston rod will oscillate during the compression and expansion strokes about the axis B B' of the cylinder, that is, will be inclined at the minimum during the strokes where the stresses are maximum and will be inclined at the maximum during the admission and exhaust strokes, where the stresses are minimum. An important reduction in the lateral stresses and friction loss is thus afforded.

Fig. 3 shows an engine having two aligned cylinders. It will be seen that, in order to obtain the proper timing in both cylinders and preserve the same relative positions of the cylinder axis with respect to the epicycloidal curves A, the crankpins 5 must be independent of one another, that is two separate crankshafts are necessary. Such a construction would become unpracticable in the case of a great number of cylinders. In order to provide a single crankshaft with an epicycloidal gear at each end, the cylinders will be arranged as shown in Fig. 3, that is are arranged in a star disposition (the axes B B, CC' DD' EE' being still tangent to circle F) and the crankpins are spaced through the same angles as the cylinders, whereby each crankpin describes a distinct epicycloidal curve A, all the curves A having an identical disposition with respect to the corresponding cylinder axis.

In the case of a two-cylinder engine, the cylinders may be disposed with their axes BB' DD' disposed as shown in Fig. 3.

Having now described my invention, what I claim as new and desire to secure by Letters Patent is:

1. In an internal combustion engine, a stationary pinion, a crankshaft, a planetary pinion secured to said crankshaft and adapted to mesh with and roll about said stationary pinion and a cylinder whose axis is tangent to a circle concentric with said stationary pinion and intersects the curve described by the crankpin at such a point that said cylinder axis coincides with the mean position of the axis of the connecting rod during the compression and expansion strokes.

2. In an internal combustion engine, a stationary pinion, a crankshaft, a planetary pinion secured to said crankshaft and adapted to mesh with and roll about said stationary pinion and a number of cylinders whose axes are tangent to a circle concentric with said stationary pinion and intersect the curves described by the respective crankpins at such points that said cylinder axes respectively coincide with the mean positions of the axes of the respective connecting rods during the compression and expansion strokes.

In testimony whereof I have signed my name to this specification.

LAZARE STÉPHANE JAUSSAUD.